US005340628A

United States Patent [19]

McKillip

[11] Patent Number: 5,340,628

[45] Date of Patent: Aug. 23, 1994

[54] LASER MARKABLE LAMINATED SHEET

[75] Inventor: Barron G. McKillip, Grand Rapids, Mich.

[73] Assignee: CCL Label, Inc., Grand Rapids, Mich.

[21] Appl. No.: 972,168

[22] Filed: Nov. 5, 1992

[51] Int. Cl.[5] .......... B32B 7/12

[52] U.S. Cl. .......... 428/40; 428/203; 428/354; 428/343; 428/480

[58] Field of Search .......... 428/40, 203, 343, 354, 428/352, 353, 355, 356, 480; 430/945

[56] References Cited

U.S. PATENT DOCUMENTS

| | | | |
|---|---|---|---|
| 4,911,994 | 3/1990 | Will et al. | 428/203 X |
| 4,987,287 | 1/1991 | Jack | 428/40 X |
| 5,071,167 | 12/1991 | O'Brien | 428/40 X |
| 5,154,956 | 10/1992 | Fradrich | 428/40 |
| 5,200,242 | 4/1993 | Hohmann | 428/203 |

OTHER PUBLICATIONS

Lasertechnics pamphlet, "The Mark of a Leader," Apr. 1990, pp. 1–8.

Lasertechnics flyer, "The Laserbrand XM Laser Marking System," Oct. 1990.

Lasertechnics flyer, "The Blazer 6000 Laser Marking System," Dec. 1989.

*Primary Examiner*—Daniel Zirker

*Attorney, Agent, or Firm*—Warner, Norcross & Judd

[57] ABSTRACT

A laser markable sheet having a thermally sensitive base sheet overlaid by a transparent cover sheet. The cover sheet is adhered to the base sheet by a transparent adhesive. Markings may be produced on the base sheet by directing a laser beam through the cover sheet and the transparent adhesive so that the beam impinges on the front surface of the cover sheet. The rear surface of the cover sheet may be coated with a pressure sensitive adhesive, and the pressure sensitive adhesive may be temporarily covered by a release liner.

11 Claims, 1 Drawing Sheet

LASER MARKABLE LAMINATED SHEET

BACKGROUND OF THE INVENTION

1. Field of the Invention

The present invention relates to a laser markable laminated sheet and, more particularly, to a sheet having a transparent laminate adhered over a thermally printable sheet.

2. Description of the Related Art

Product marking devices are known which employ the heat of a laser beam. With such devices, a controlled laser beam burns a product code, date, or the like, into the surface of a label, or directly into the surface of the product container or container closure. In a typical laser marking application, a white or light colored paper product carton or box has a rectangular area coated with a dark ink. The laser beam is directed on the dark ink and controlled with a mask so as to burn away the dark ink in selected areas to expose the white surface beneath the ink and thus form the desired markings. A suitable laser marking system for such an application is the "Blazer 6000" laser marking system sold by Lasertechnics of Albuquerque, N.M.

A laser marking system of the type described above is subject to significant disadvantages. The design of the product container or label must include an area coated with a dark, contrasting ink. This adds a step of printing, and may conflict with the desire to have a predominately white or light colored package. Furthermore, the burned-away ink becomes airborne particles which must be captured in order to prevent contamination of the products, the containers, and the packaging equipment. Such airborne particles are particularly objectionable in a clean environment such as that of a pharmaceutical laboratory or factory.

SUMMARY OF THE INVENTION

The present invention provides a laminated sheet suitable for use with laser marking systems which does not require a contrasting ink coating and which does not release airborne particles. The laminated sheet of the invention includes a base sheet having a thermally sensitive surface and a transparent cover sheet overlyingly adhered to the thermally sensitive surface of the base sheet by a transparent adhesive. In use, a laser beam is directed through the cover sheet and the adhesive onto the thermally sensitive surface of the base sheet. The heat of the laser produces the markings on the surface of the base sheet beneath the transparent sheet. The transparent sheet ensures that no particles are released from the marked sheet into the air.

According to other features of the invention, the rear surface of the base sheet may be coated with a pressure sensitive adhesive by which the sheet may be adhered to an article or container before or after the sheet is marked. A release liner may be provided to be temporarily adhered to the pressure sensitive adhesive on the rear of the sheet.

These and other objects, advantages, and features of the present invention will be more fully understood and appreciated by reference to the written specification and appended drawings.

DESCRIPTION OF THE PREFERRED EMBODIMENT

Figure 1:
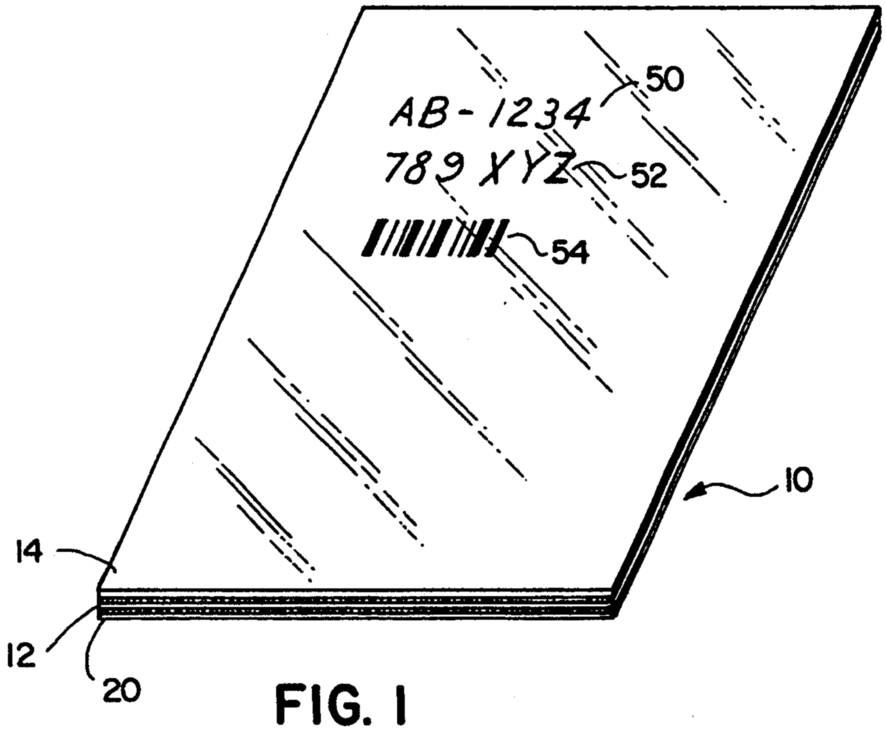
FIG. 1 is a top perspective view of a laser markable sheet according to the principles of the invention.
Figure 2:
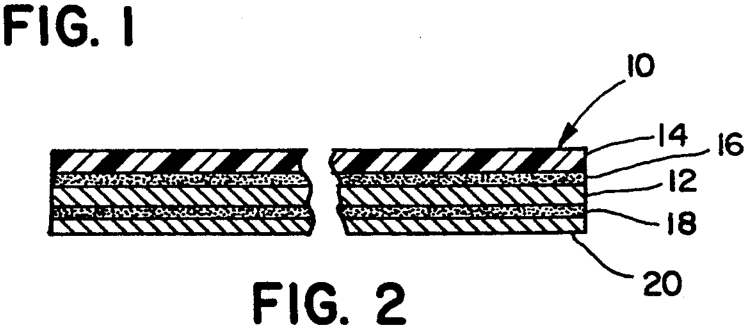
FIG. 2 is a sectional view through the laser markable sheet of FIG. 1 with thicknesses exaggerated for clarity of illustration.

By way of disclosing a preferred embodiment, and not by way of limitation, there is shown in FIGS. 1 and 2 a laser markable sheet 10 which includes in its construction a flexible base sheet 12 having opposed front and rear major surfaces, a flexible, transparent cover sheet 14 coextensively overlying the front surface of the base sheet 12, and a layer of transparent, permanent, pressure sensitive adhesive 16 between the base sheet 12 and the cover sheet 14 which adheres the cover sheet to the base sheet.

Optionally, the rear surface of the base sheet is coated with a layer of pressure sensitive adhesive 18, and a release liner sheet 20 is temporarily adhered to the pressure sensitive adhesive 18. The pressure sensitive adhesive 18 is used to adhere the base sheet 12 to an article such as a product or a product container. The release liner covers the pressure sensitive adhesive and, in a known manner, is peeled away to expose the pressure sensitive adhesive when the base sheet is to be adhered to an article.

Base sheet 12 is a thin, flexible, thermally markable material, such as an opaque paper material having at least its front surface treated with a thermal sensitizing solution. One suitable material for the base sheet is available under the designation "Ricoh 120 LAM." The front surface of the base sheet is thermally sensitive such that the heat of a laser beam directed at the front surface produces darkened markings in the areas impinged on by the laser.

Cover sheet 14 is of a thin, transparent, flexible material, preferably a polymeric material such as polyester or polypropylene. A laser beam directed at the front surface of the base sheet 12 passes through the cover sheet and the transparent adhesive leaving both intact. If any particles are produced from the base sheet due to burning from the heat of the laser beam, such particles are trapped between the cover sheet and the base sheet, thus prevented from contaminating the air, the product or container to which the base sheet may be adhered, or the packaging equipment which may be in use.

Figure 3:
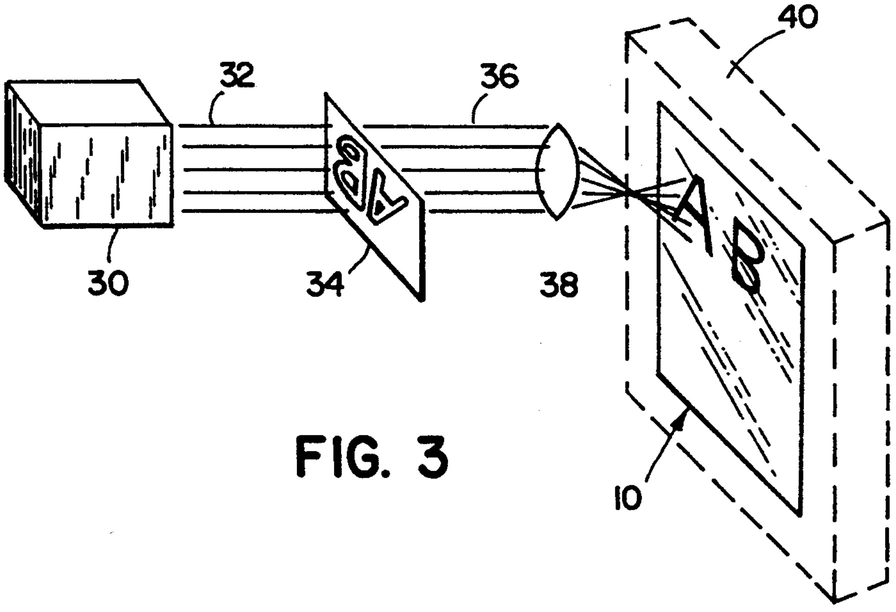
FIG. 3 is a diagrammatic, simplified view of a laser markable sheet according to the principles invention being marked with a laser marking system.

FIG. 3 illustrates, in simplified form, the use of the laser markable sheet 10 with a laser marking system. A laser beam generator 30 directs a laser beam 32 through a mask 34. The beam 36 passing through mask then passes through suitable optics 38 which focuses the beam on the surface of the laser markable sheet 10.

As shown in FIG. 1, the laser markable sheet 10 may be marked with any desired information, such as product codes 50, lot numbers 52, bar codes 54, expiration dates, etc.

The laser markable sheet 10 may be in the form of discrete sheets, or in coiled or fan-folded continuous webs of many sheets joined edge-to-edge. The markings may be produced on a sheet either before or after the sheet is adhered to an article 40.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A laser markable sheet comprising:

a base sheet having a thermally sensitive front surface; and a transparent top sheet overlyingly adhered to said front surface of said base sheet;

whereby a laser beam directed through said top sheet and onto said thermally sensitive front surface of said base sheet will activate said thermally sensitive front surface and produce markings in the areas impinged on by the laser, and further whereby any particles released as a result of the marking are trapped between said base sheet and said top sheet, said laser beam while passing through said top sheet leaving said top sheet intact.

2. The laser markable sheet of claim 1 wherein said transparent sheet comprises polyester.

3. The laser markable sheet of claim 1 wherein said transparent sheet comprises polypropylene.

4. The laser markable sheet of claim 1 further comprising a transparent permanent pressure sensitive adhesive disposed between said base sheet and said top sheet.

5. The laser markable sheet of claim 1 wherein said base sheet further includes a rear surface opposite said front surface, and further comprising a pressure sensitive adhesive on said rear surface.

6. The laser markable sheet of claim 5 further comprising a release liner temporarily adhered to said pressure sensitive adhesive on said rear surface.

7. A laser markable sheet comprising:

a flexible base sheet having a thermally sensitive front major surface and a rear major surface opposed to said front major surface;

a flexible, transparent cover sheet overlying said front surface of said base sheet; and a layer of transparent adhesive disposed between said base sheet and said cover sheet, said adhesive adhering said cover sheet to said base sheet;

whereby markings may be thermally produced on said front major surface by a laser beam passing through said cover sheet and said transparent adhesive and impinging on said front major surface, and further whereby any particles released as a result of the marking are trapped between said base sheet and said cover sheet, said laser beam while passing through said top sheet and said adhesive leaving said top sheet and said adhesive intact.

8. The laser markable sheet of claim 7 wherein said transparent sheet comprises polyester.

9. The laser markable sheet of claim 7 wherein said transparent sheet comprises polypropylene.

10. The laser markable sheet of claim 7 further comprising a layer of pressure sensitive adhesive on said rear major surface of said base sheet.

11. The laser markable sheet of claim 10 further comprising a release liner temporarily adhered to said pressure sensitive adhesive on said rear major surface.

* * * * *